No. 834,110. PATENTED OCT. 23, 1906.
C. A. DEVENNY.
BRAKE ADJUSTER.
APPLICATION FILED JULY 27, 1906.
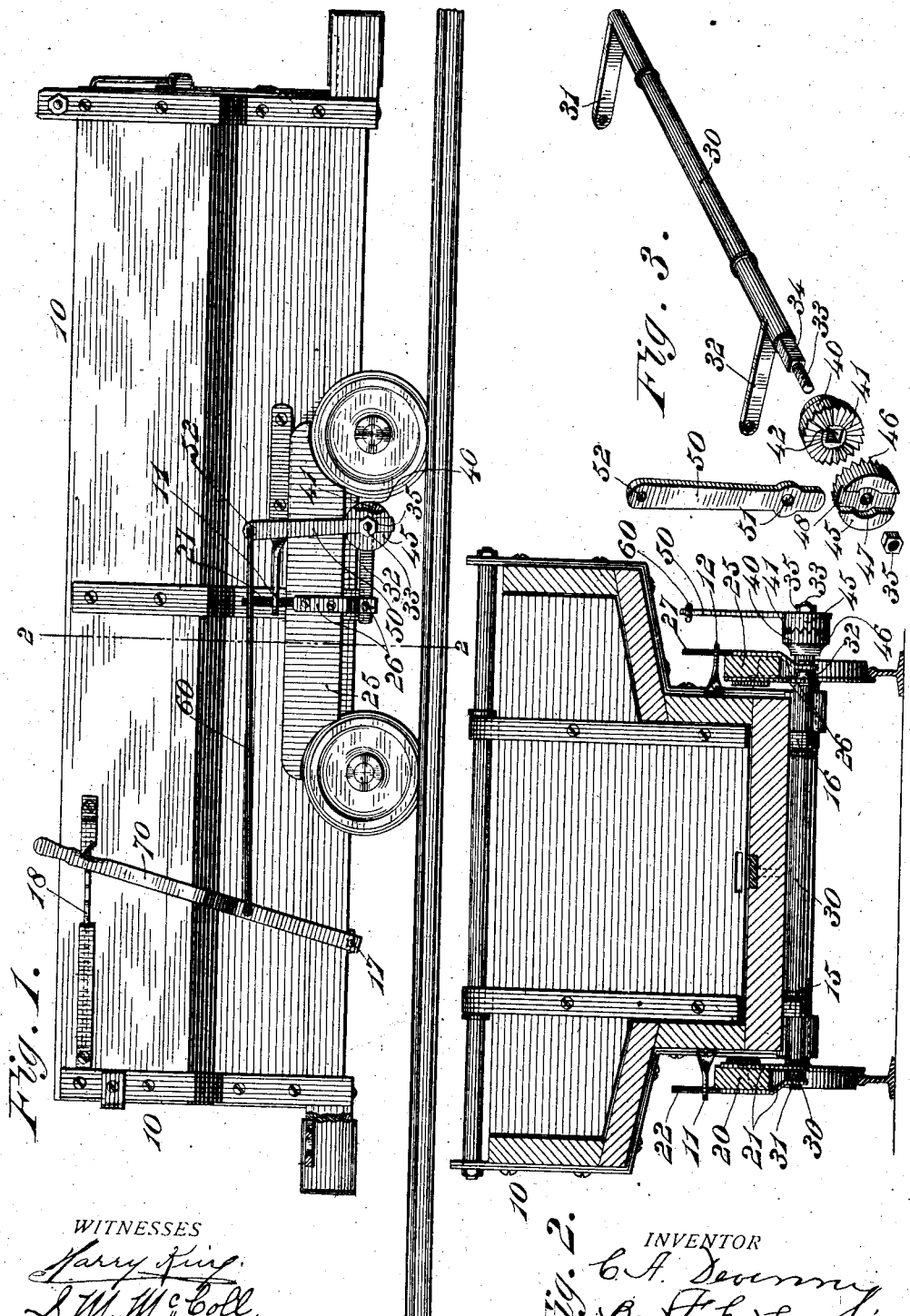
WITNESSES
INVENTOR
Attorney

UNITED STATES PATENT OFFICE.

CHARLES A. DEVENNY, OF WELCH, WEST VIRGINIA.

BRAKE-ADJUSTER.

No. 834,110.  Specification of Letters Patent.  Patented Oct. 23, 1906.

Application filed July 27, 1906. Serial No. 328,080.

*To all whom it may concern:*

Be it known that I, CHARLES A. DEVENNY, a citizen of the United States of America, and a resident of Welch, in the county of McDowell, in the State of West Virginia, have invented certain new and useful Improvements in Brake-Adjusters, of which the following is a specification.

The invention relates to a device for taking up the lost motion caused by the wearing of the brake-surfaces in vehicle or other brakes.

The object of the invention is to provide a brake-adjuster which is simple in construction and operation and which may be quickly and positively adjusted by an unskilled person.

In the accompanying drawings, in which like reference characters indicate corresponding parts, Figure 1 represents a side elevation of a mine-car with this improved brake-adjuster applied thereto. Fig. 2 represents a transverse section thereof, taken on line 2 2 of Fig. 1. Fig. 3 represents a perspective view of the members composing this improved brake-adjuster in position ready for assembling.

In the form herein shown this improved brake-adjuster is applied to a mine-car 10, having on opposite sides ordinary top brake-heads 20 and 25, each spanning the space between and engaging the wheels of one side. A rock-shaft 30 extends transversely across the car under the bottom thereof and is mounted to rotate in brackets 15 and 16 on the under side thereof and serves as a brake-beam to connect the brake-heads of opposite sides. This brake-beam 30 is preferably provided near opposite ends with lateral arms 31 and 32, the free ends of which are secured to the brake-heads 20 and 25 by means of clips 21 and 26. These clips have guide-studs 22 and 27 extending upward therefrom through eyes 11 and 12, attached to the opposite sides of the car-body.

The rock-shaft 30 is provided with a fixed clutch member 40, having a serrated outer face 41, and with a loose clutch member 45, having an inner serrated face 46. The member 45 is adjustable into and out of contact with the member 40 and the serrated faces of said members permit them to be firmly locked together, so that the disk 40 will turn with the disk 45. To secure the clutch members or disks, the rock-shaft 30 is preferably provided near one end with an angular portion 34 and at said end adjacent to said angular portion with a round screw-threaded terminal 33. The disk 40 is provided with an angular central aperture 42, adapted to fit the angular portion 32, and the disk 45 is provided with a round central aperture 47, adapted to fit loosely on the terminal 33. A nut 35 on said terminal serves to hold said disks in interlocking contact and permit the outer one to be separated from the inner one to effect adjustment, as hereinafter described. The member 45 is provided on its outer non-serrated face with a groove or recess 48, which preferably extends diametrically across the face of said member, being enlarged at opposite sides of the aperture therein.

A brake-lever 50, having one end shaped to fit the recess 48 in the member 45, is provided with a hole 51, which fits over the end of the rock-shaft 30 between the nut 35 and the member 45. The free end of this lever has an eye 52 therein which is engaged by a brake-rod 60, secured at its outer end to an actuating brake-lever 70. The actuating brake-lever 70 is pivoted on a pivot 17 on the car-body and engages a lever-lock 18, attached to the side of the car for holding the brake in adjusted position.

In the use of this improved brake-adjuster to adjust the brake-heads after wear thereof the nut 35 is removed and the members 40 and 45 are separated. The member 40 is then turned in the opposite direction to the direction in which the brake-lever works a distance sufficient to take up the lost motion caused by wear of the brake-shoes, and the members are again moved into interlocking engagement and the nut screwed on and the brake is again ready for use. This adjustment may be made in a few minutes by any unskilled person, thus saving the expense of employing a skilled mechanic to adjust the worn brake and the time required to secure the services of such a person.

I claim as my invention—

1. The combination of a brake-head, a rock-shaft provided with an arm connected with said brake-head, relatively adjustable interlocking clutch members respectively loose and fixed on said shaft, and a brake-lever locked with said loose member.

2. The combination of a brake-head, a rock-shaft provided with an arm connected with said brake-head, relatively adjustable interlocking clutch members respectively loose and fixed on said shaft, a brake-lever locked with said loose member, an actuating-lever, and a brake-rod connecting said levers.

3. The combination of a brake-head, a rock-shaft, means connecting said brake-head with said rock-shaft, a disk fixed on said rock-shaft and provided with a serrated face, a disk loose on said rock-shaft and provided with a serrated face adjacent to the serrated face of said fixed disk, and means for holding said disks in locking contact.

4. A brake-adjuster comprising two members adapted to be mounted on a rock-shaft, one member having an angular aperture to fit an angular portion of said shaft, and the other member having a round aperture to turn on said shaft, each of said members having a serrated face, said round-apertured member having a recess in its non-serrated face, and a brake-lever adapted to fit in said recess.

5. The combination of a rock-shaft having an angular portion and a rounded end adjacent to said angular portion, a disk having an angular aperture to fit said shaft portion and provided with a serrated face, another disk having a round aperture to fit the rounded end of said shaft and provided with a serrated face to interlock with the serrated face of said first-mentioned disk, a brake-lever engaging said round-apertured disk, and means for holding said disks and lever in locked position.

6. The combination of a brake-shaft having an angular portion and a round end adjacent thereto, two members adapted to be mounted on said brake-shaft, one member having an angular aperture and a serrated face, and the other a round aperture and a serrated face, said round-apertured member having a groove extending across the non-serrated face thereof, a brake-lever adapted to fit in said groove, and means for holding said brake-lever and members in adjusted position.

7. The combination of a rock-shaft, two clutch members mounted on said rock-shaft, one of said members being fixed thereto and the other mounted to turn thereon, said members having their adjacent faces serrated to interlock one with the other, the movable member having a recess in its non-serrated face, a brake-lever adapted to fit in said recess and engage said member and means for holding said brake-lever and clutch members in locked position.

8. The combination of a rock-shaft, two clutch members relatively adjustable and respectively loose and fixed on said shaft, the movable member having a groove extending across its outer face and enlarged near its center, and a brake-lever having one end shaped to fit in the groove of said movable member, and means for holding said brake-lever and clutch members in locked position on the rock-shaft.

CHARLES A. DEVENNY.

Witnesses:
WYNDHAM STOKES,
J. GRAHAM SALE.